United States Patent Office 3,463,628
Patented Aug. 26, 1969

3,463,628
METHOD OF KILLING ELODEA
Robert W. Hyde, Crystal River, Fla. 32629
No Drawing. Filed Aug. 30, 1966, Ser. No. 575,954
Int. Cl. A01n *17/00; 11/00*
U.S. Cl. 71—66     1 Claim

ABSTRACT OF THE DISCLOSURE

A method of killing Elodea by dumping commercial sulfuric acid, which is at least 90% pure, and therefor considerably heavier than water, directly into Elodea-clogged bodies of water such that it spreads out as a layer on the beds of such bodies of water.

---

This invention relates to a method of killing the aquatic plant Elodea, or Anacharis. This plant is used extensively in aquariums where it serves some decorative function. However, the primary reason for its use is that it is an oxygenator. Thus, in aquariums it serves a useful purpose.

It is a fast growing plant and under certain conditions outside of aquariums it can grow at an uncontrollable rate and become a serious nuisance. It appears that the plant grows best in water that is slightly alkaline, clear, and in areas where there is a considerable amount of sunlight the year round. These conditions exist in many of the coastal waters in our southern states, for example, Florida, and particularly in spring fed waters such as those that exist in areas such as Crystal River, Fla. In this particular location the Elodea plant in a period of a little more than three years completely clogged the spring fed coastal canals that, prior to becoming clogged, were one of the main tourist attractions of the area.

Many efforts were made to stop the spread of the growth of the plant in the Crystal River area but they were unsuccessful, and the spring fed canals and rivers in the area became clogged to an extent that they prevented the passage of pleasure boats and it became necessary to use underwater cutters in an attempt to keep passageways open. This proved to be a serious mistake because the weed after being cut sinks to the bottom where new sprouts start at each leaf joint. Thus, the underwater cutting operations succeeded only in furthering the rapid spread of this nuisance plant.

I have found that the plant is sensitive to water that is slightly acid and if kept in water that is at an acidity level of approximately pH 6, it will die in time. But changing the pH value of all of the alkaline waters that constantly flow from the springs in the Crystal River area from a pH 8, for example, to a pH 6 would be an impossible task. Further studies have shown that the higher the acid content of the water, the faster the plant dies. Then resorting to the use of sulfuric acid that is approximately 94 percent pure, this being the usual commercial purity used by industry for many purposes, I found that the plant is instantly killed upon contact.

Sulfuric acid in this concentration weighs almost twice as much as water. I have found that the plant can be successfully killed by dumping commercial sulfuric acid directly into Elodea clogged waters where it sinks directly to the bottom or bed of the stream or canal. The sulfuric acid sinks to, and remains on, the bottom of the stream or canal, spreading out as a layer. In a moving stream it eventually moves out to sea with the current of the stream, killing all Elodea as it moves past it. In tidal waters the sulfuric acid may be placed in a canal, for example, at high tide and then it flows with the water in the canal out to sea as the tide recedes. In areas where there is little or no current, I find that the acid is neutralized by the alkaline waters in which the Elodea plant thrives.

The results of tests that have been completed to date have produced dramatic results in clearing canal areas that were completely clogged with the weed prior to the treatment. It is found that the presence of the layer or pool of acid on the botom of the canal or stream has no adverse effect upon fish, because they appear to be extremely sensitive to its presence and either stay above it in the acid free water in the upper part of the stream or canal or flee from it as it approaches in flowing either as a result of the current in the stream or the receding of a tide.

Having described my invention I claim:

1. A method of killing Elodea which comprises dumping commercial sulfuric acid which is at least 90% pure directly into Elodea-clogged bodies of water such that the acid spreads out as a layer on the beds of such bodies of water.

References Cited

Cook et al.: Chemical Weed Killers, National Research Council of Canada, Bulletin No. 18, 1937, p. 76.

Martin: Guide to the Chemicals Used in Crop Protection, Canada Department of Agriculture, third ed., 1957, p. 284.

JAMES O. THOMAS, Jr., *Primary Examiner*

PO-1050
(5/69)

UNITED STATES PATENT OFFICE
CERTIFICATE OF CORRECTION

Patent No. 3,463,628      Dated August 26, 1969

Inventor(s)      Robert W. Hyde

It is certified that error appears in the above-identified patent and that said Letters Patent are hereby corrected as shown below:

Column 2, Claim 1, Line 39, delete "such" and insert -- in sufficient quantity --.

SIGNED AND
SEALED

DEC 23 1969

(SEAL)
Attest:

Edward M. Fletcher, Jr.
Attesting Officer

WILLIAM E. SCHUYLER, JR
Commissioner of Patents